Aug. 12, 1969  W. HÖFLER  3,461,456
APPARATUS FOR AUTOMATICALLY DETERMINING THE
TOTAL PITCH ERROR OF GEARS OR THE LIKE
Filed April 23, 1968  2 Sheets-Sheet 1

INVENTOR.
WILLY HOEFLER

BY Otto John Munz
ATTORNEY

INVENTOR.
WILLY HOEFLER

BY Otto John Munz

ATTORNEY

United States Patent Office 3,461,456
Patented Aug. 12, 1969

3,461,456
APPARATUS FOR AUTOMATICALLY DETERMINING THE TOTAL PITCH ERROR OF GEARS OR THE LIKE
Willy Höfler, 38C Elbingerstrasse, 75 Karlsruhe, Germany
Filed Apr. 23, 1968, Ser. No. 723,547
Claims priority, application Germany, May 5, 1967, H 62,638
Int. Cl. G01d 9/36, 9/32
U.S. Cl. 346—49     4 Claims

ABSTRACT OF THE DISCLOSURE

A gear teeth pitch error recording instrument which consists of two different recording systems, the first of which is designed so as to record the individual pitch errors and to return to its original position after each measurement, while the second recording system is connected to the first system only during the period of its movement from original position to the highest position of each movement of the first system and is disconnected from the latter during its return movement thus recording total pitch error.

---

The present invention relates to an apparaus for automatically determining the total pitch error of gears with straight or helical teeth or grooved parts in which the individual pitch errors are measured and the electrical values representing these errors are transmitted with or without amplification to a recording instrument, for example, a compensating measuring or recording instrument.

When testing the quality and accuracy especially of gears it is of considerable importance to ascertain the individual pitch errors of the teeth as well as the total pitch error of all teeth of a gear since it is then possible to anticipate to what extent a certain gear may be relied upon to transmit a rotary movement without variations of its angular velocity and without errors in angular values, since these properties of each gear have not only a decisive influence upon the quality of computing mechanisms of aeronautical navigation apparatus, theodolites, optical indexing heads and many other instruments in which such gears may be used, but also of indexing mechanisms and work tables of machine tools which contribute very highly to the quality of the products which are made by such machines. Pitch errors of the individual teeth and the total pitch error of all teeth of gears of high-grade transmissions also cause considerable additional dynamic stresses in the gear teeth and due to the centripetal forces resulting therefrom also in the gear bearings, and they lead eventually to a considerable noise of such transmissions.

For ascertaining the total pitch error at its generally necessary first to measure the individual pitch errors between adjacent teeth and to carry out such measurements successively on all teeth of a gear. The positive and negative deviations from the intended pitch then result by an algebraic step-by-step addition to the preceding value or values in plotted points on a graph which indicate the course of the curve of the total pitch error. If, for example, the first test value amounts to $-2.9$ $\mu$m. and the second test value to $+1.1$ $\mu$m. and these values are then added together, the result will be a value of $-1.8$ $\mu$m. This value of $-1.8$ $\mu$m. is then added to the next test value, for example, $+2.1$ $\mu$m. which results in a value of $0.3$ $\mu$m., and so forth. The curve which is thus plotted indicates directly the absolute value of the total pitch error $F_{t\,max.}$ as a sum of the maximum plus values and maximum minus values of the individual pitch errors.

In actual practice, pitch error tests have so far been carried out by determining the individual pitch errors between adjacent teeth, for example, by means of a manual measuring instrument and by plotting them one after another on a graph. Although such a graph then indicates the size of individual pitch deviations $f_u$ or the maximum pitch deviation, it does not indicate the actual quality and pitch accuracy of the gear tested nor the size of the total pitch error of the entire gear since the measurements of each individual pitch error only determines the deviation of the distance between two adjacent teeth from the intended distance, while the zero position from which the measurement is started is a position which depends upon the tooth which has been previously measured and which might be defective. A proper judgment about the quality of a gear insofar as its accuracy in transmitting angular velocities and angles of rotations is concerned and also about the noise which it might produce and the length of its useful service can, however, not be attained except after the total pitch error has been calculated the curve of the total pitch error has been graphically plotted. These calculations are, however, very complicated and require considerable time, especially if they concern gears of large diameters and with a large number of teeth, and therefore the determination of the total pitch error of the gear teeth is usually omitted, although it is well known for a long time that a knowledge of this value is extremely important for judging the quality of gears.

It is therefore an object of the present invention to provide an apparatus which is designed so as to permit especially the curve of the total pitch error to be automatically plotted on a graph and thus also the total pitch error itself to be determined automatically and within the shortest possible period of time. Another object of the invention is to provide such an apparatus which does not require any complicated and expensive electronic computer elements for determining and recording the test results and for insuring their consistency.

For attaining these objects, the present invention provides an apparatus of the general type as first mentioned above which comprises a recording instrument consisting of two different recording systems the first of which is designed so as to record the individual pitch errors and to return to its original position after each movement corresponding to one measured pitch error, while the second recording system is connected to the first system only during the period of its movement from its original position to the highest position of each movement of the first system and is disconnected from the latter during its return movement and arrested in this highest position. Thus, by means of two different recording systems, one of which forms the final element, for example, of a compensating measuring or recording instrument, it is now possible to produce a graphical recording of the total pitch error of a gear directly from the measurements of the individual pitch errors which may be carried out in a conventional manner by means of tracing heads or the like. The new method and apparatus therefore permit small as well as large gears to be tested directly on the gear-cutting machine and, since these measuring and recording operations no longer require any long and complicated calculations, they are no longer limited for reasons of costs to gears which have to comply with exceptionally high standards of quality but they may be carried out quickly and at a very low cost on any gears.

It is another feature of the invention that according to one preferred embodiment thereof the recording systems of the new apparatus comprise two recording carriages which are located adjacent to each other and are slidable on separate slideways and are connected to each other by a metal rail which is secured to the first carriage and slidable within a bushing on the second carriage; that for operatively connecting the two recording systems to each other, the second carriage is provided with an electromagnetic clutch which acts upon the metal rail, and that for locking the second carriage during the return movement of the first carriage in the particular position on its slideway to which this second carriage has been moved by the preceding individual pitch test an electromagnetic clamping device is provided. It is another feature of the invention to provide very simple means for effecting this locking action by providing a connecting bracket which is secured by a thin metal strip to the second carriage and is movable between a stationary part of the housing of the apparatus and a clamping rod or roller, and by providing a brake magnet and a lever which is pivotable by this magnet and, when this magnet is energized presses the clamping rod against the bracket and thereby the bracket against the stationary part of the housing so that the bracket and thus also the second carriage are clamped in a fixed position.

The apparatus according to the invention is therefore designed so that a movement of the first carriage from its starting position to its farthest position is transmitted by the metal rail to the second carriage. After reaching this farthest position, the clutch magnet on the second carriage is switched off so as to permit the first carriage to return to its starting position, while the second carriage is locked by the electromagnetic clamping device in the position which it has reached. When the next test value is determined which corresponds to the following pitch error, the first recording carriage starts its movement from the starting position in the positive or negative direction and thereby again takes along the second carriage until it reaches the farthest position of this movement. Thus each test value which causes the last movement is algebraically added on the second recording carriage to the preceding value or values.

By providing two recording carriages it is thus possible to plot on a graph not only the curve of the total pitch error but at the same time also the individual pitch errors. In the event, however, that it is only necessary to plot the curve of the total pitch error and that the measuring and recording instrument must be confined within a relatively small space, the apparatus according to the invention may be designed so that the cord or cable for moving a measuring carriage runs over a pulley which is freely rotatable on a shaft but may be positively connected to this shaft by means of a magnetic clutch so as to transmit its rotary movement thereto during the period in which this clutch is actuated. The invention further provides that another pulley which is secured to this shaft is connected by another cord or cable to a recording carriage, and that the shaft may be locked in a fixed position by a locking magnet which is mounted on the housing of the apparatus and adapted to act upon a flange which is secured to one of the shafts.

The apparatus according to either of the embodiments of the invention as above described permits the total pitch error of a gear to be ascertained and graphically recorded without requiring any expensive electronic computer elements. In actual practice it has been found that the measured values when reproduced have a maximum error of 0.01 $\mu$m. which is insignificant as compared with the size of the individual pitch errors as normally occur. Since the recording or measuring carriage of, for example, a compensation measuring instrument is moved with a considerable traction in a direction parallel to the scale, the apparatus will operate very accurately for a very long time even under difficult working conditions.

The features and advantages of the present invention will become further apparent from the following detailed description of two preferred embodiments thereof which are diagrammatically illustrated in the accompanying drawings, in which—

FIGURE 2 shows a graph on which the curves are plotted which are registered by the two recording systems according to FIGURE 1; while

Figure 1:
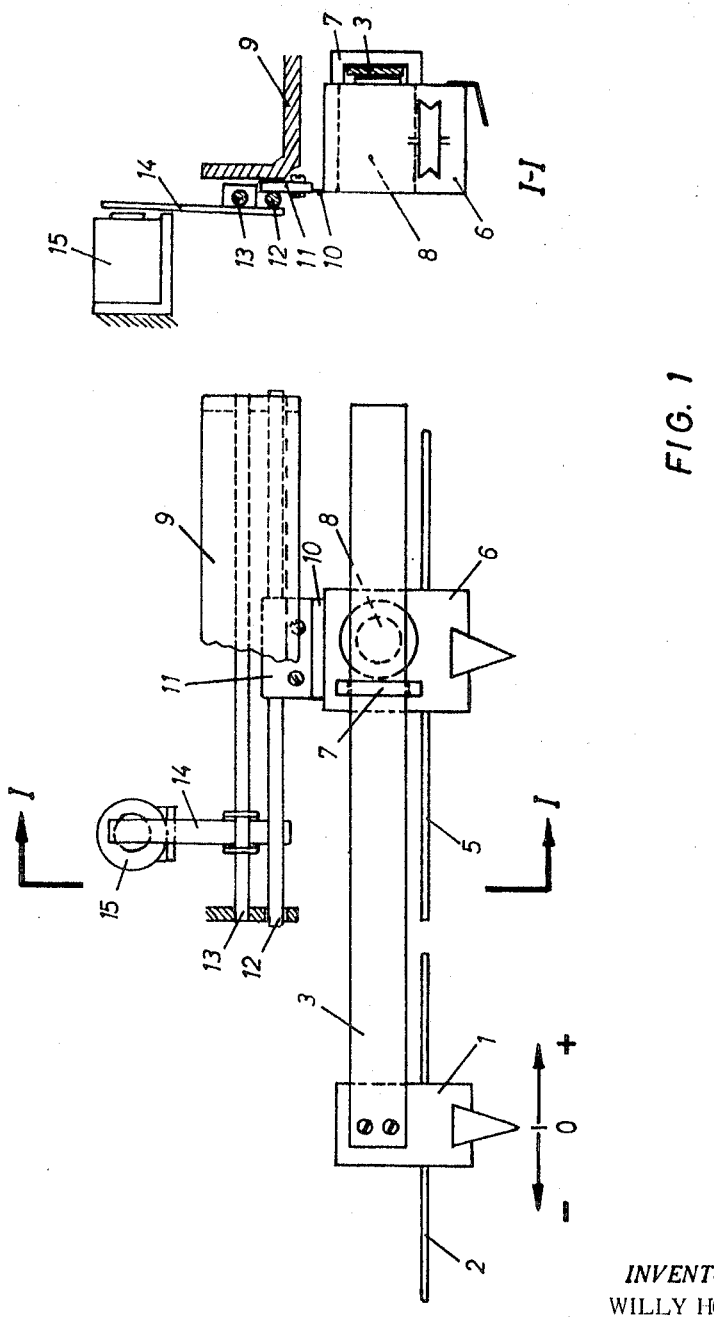
FIGURE 1 shows at the left side an elevation of an apparatus with two recording systems adjacent to each other and the right side a cross section which is taken along line 1—1 of this elevation.
Figure 3:
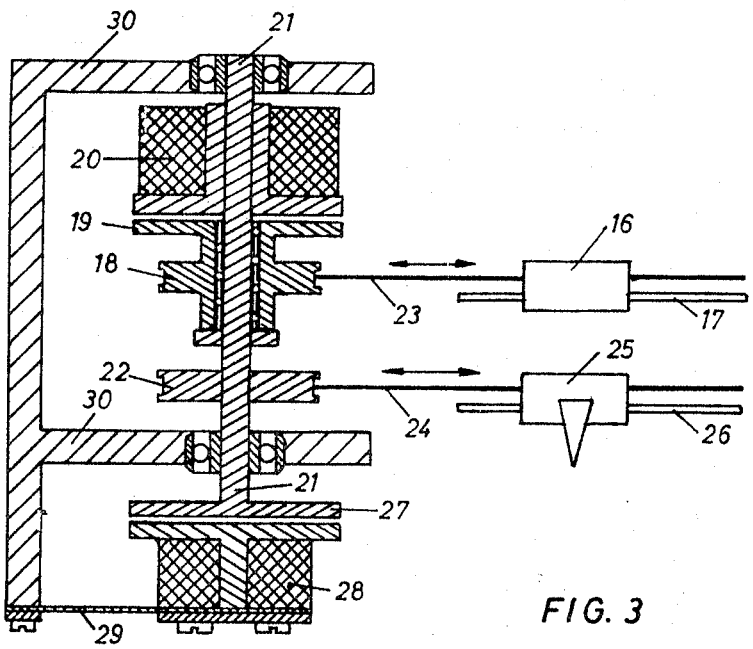
FIGURE 3 shows a cross section of a simplified apparatus according to the invention for recording only the total pitch error.

In both embodiments of the invention as illustrated in FIGURES 1 and 3, the electrical value of each individual pitch error is transmitted to a compensation measuring instrument which consists of a measuring motor, cords or cables and pulleys therefor, measuring or recording carriages, and balancing potentiometers. The value which has been measured by the inductive tracer is compared with the output or compensating voltage of a Wheatstone bridge which is supplied with a constant voltage. If the two voltages differ from each other, a positive or negative differential voltage will occur depending upon whether the compensating voltage is larger or smaller than the constant voltage. Finally, this differential voltage is transmitted via an amplifier to the control winding of the measuring motor. Depending upon the polarity of the differential voltage, this motor then moves the measuring or recording carriage by means of the cord or cable drive in the respective direction along the balancing potentiometer of the bridge until the measuring voltage and the compensating voltage are again equal. By providing a suitable amplifier and measuring motor, the measuring or recording carriage will be moved with a considerable force parallel to the graduated scale. Consequently, this measuring or recording carriage may also be employed for moving another element without danger that its accuracy will be thereby affected.

FIGURE 1 of the drawings shows two different views of two recording systems adjacent to each other. The recording carriage 1 which forms a part of the compensating measuring instrument is movable along the slideway 2 toward the right or left of its zero position depending upon whether the pitch error has a plus or minus value. The recording carriage 6 which records the total of the pitch errors is movable along the slideway 5. The metal rail 3 which is rigidly connected to the recording carriage 1 as guided within a guide bushing 7 which is secured to carriage 6. When carriage 1 starts to move, a magnet 8 is energized so as to transmit this movement through the metal rail 3 to the carriage 6. When carriage 1 reaches the end of its movement, magnet 8 is switched off and a magnet 15 is switched on for locking the carriage 6 in the position to which it has been moved. Carriage 1 then returns to its zero position. During this movement, the metal rail 3 slides along the guide bushing 7 in carriage 6 without transmitting any movement to this carriage. The two views of the apparatus as shown in FIGURE 1 also illustrate the general construction of the clamping device for locking the carriage 6 in a fixed position. When magnet 15 is not energized, a bracket 11 which is connected by a thinner part 10 to the carriage 6 is freely movable between a stationary part 3 of the housing of the apparatus and a clamping rod 12, while when magnet 15 is energized it pivots a lever 14 about its axis 13 so that the lower arm of this lever presses against rod 12 which is thereby pressed against bracket 11 which, in turn, is pressed against the housing part 9. Bracket 11 together with carriage 6 to which it is secured will thus be clamped in a fixed position.

Figure 2:
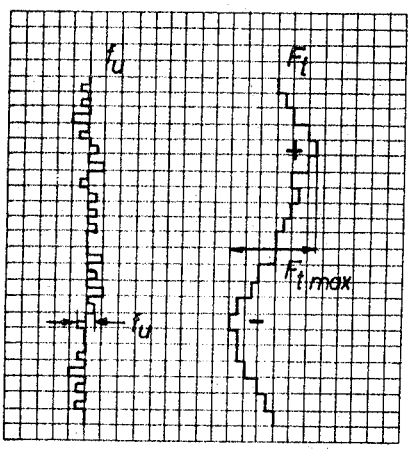

The curves which are measured and recorded by these two recorders are shown in FIGURE 2. The recording carriage 1 of the compensating measuring instrument ascertains the individual pitch errors or pitch jumps $f_u$ and also records the size of these jumps, while the other recording carriage 6 records the total $F_t$ of these pitch errors. This curve indicates the variations of the angular velocity of the gear or other element tested from which the absolute value of the total pitch error $F_{t\ max.}$, i.e. the maximum angle error, may be read which constitutes an addition of the absolute amounts of the highest plus and minus values.

FIGURE 3 illustrates another embodiment of the invention which omits the graphic recording of the individual pitch deviations and therefore permits the apparatus to be made of a more compact construction. The movement of the measuring carriage 16 of the balancing potentiometer of the compensating instrument which is movable along a slideway 17 is transmitted by a cord or cable 23 to a pulley 18 which is rotatably mounted on a shaft 21 and integral with a coupling flange 19 which is operatively associated with a clutch magnet 20 which is secured to the shaft 21. Rigidly secured to this shaft are further a pulley 22 and a brake flange 27 which is operatively associated with a brake magnet 28. The recording carriage 25 which is slidable along the slideway 26 and adapted to record the total pitch error is moved by the cord or cable 24 which is looped around the pulley 22. Brake magnet 28 which is connected to the housing 30 by a metal strip 29 serves for locking the recording carriage 25 to the brake flange 27 on shaft 21. When the measuring carriage 16 is moved, the brake magnet 28 is switched off, while the clutch magnet 20 is energized so that flange 19 on pulley 18 will transmit this movement to shaft 21. When carriage 16 has reached its farthest position in accordance with one pitch error, the clutch magnet is switched off, while the brake magnet 28 is energized so as to lock the recording carriage 26 in a fixed position.

Having thus fully disclosed my invention, what I claim is:

1. In an apparatus for automatically determining the total pitch error of gears or similar elements having straight or helical teeth, wherein the individual pitch errors of the teeth of each gear are measured and the measured electrical values representing these errors are transmitted with or without amplification to a recording instrument, the improvement according to which said recording instrument comprises two different recording systems, the first of said systems being movable from a zero position to a position corresponding to the individual pitch error of each tooth and adapted to record successively the individual pitch errors of said teeth, means for returning said first system to its zero position after each recording movement corresponding to a measured pitch error, connecting means for positively connecting the second recording system to said first system only during the period of each recording movement of said first system and for disconnecting said second system from said first system during each return movement of the latter so that said second system will be taken along by said first system only during each recording movement of the latter, and means for locking said second system in a fixed position during said return movement of said first system.

2. An apparatus as defined in claim 1, wherein said two recording systems comprise two separate slideways laterally adjacent to each other, two separate recording carriages each slidable along one of said slideways, a rail-like member secured at one end to a first of said carriages, and a bushing mounted on the second carriage, said rail-like member extending through and guided by said bushing, said connecting means comprising an electromagnetic clutch mounted on said second carriage and adapted to act upon said rail-like member so as to connect said two carriages to each other during each recording movement of said first carriage, said locking means comprising electromagnetic clamping means for clamping said second carriage in a fixed position on its slideway.

3. An apparatus as defined in claim 2 and having a housing further comprising a bracket having a thin metal strip connecting said bracket to said second carriage, a clamping rod extending substantially parallel to the direction of movement of said second carriage and said bracket, said electromagnetic clamping means comprising an electromagnet and a two-armed lever mounted so as to be pivotable about a fixed axis, said bracket on said second carriage being movable between said clamping rod and a stationary part of said housing, said electromagnet when energized pivoting said lever so as to press said rod against said bracket and thereby said bracket against said stationary part and thereby clamping said bracket together with said second carriage in a fixed position.

4. An apparatus as defined in claim 1, wherein said two systems comprise a measuring carriage, a shaft having a flange on one end thereof, means for rotatable mounting said shaft, a pulley rotatable mounted on said shaft, a belt, cable or the like connected to said carriage for moving the same and wound around said pulley for turning the same, a second pulley secured to said shaft, a recording carriage, a second belt, cable or the like connected to said recording carriage and wound around said second pulley, an electromagnetic clutch secured to said shaft and when energized positively connecting said first pulley to said shaft so that the movement of said measuring carriage is transmitted to said recording carriage, said locking means comprising an electromagnet mounted in a fixed position and when energized acting upon said flange so as to prevent any rotation of said shaft.

References Cited

UNITED STATES PATENTS

| 1,133,455 | 3/1915 | Bard | 346—30 |
| 3,069,779 | 12/1962 | Bauer et al. | 33—179.5 |

RICHARD B. WILKINSON, Primary Examiner

JOSEPH W. HARTARY, Assistant Examiner

U.S. Cl. X.R.

33—179; 73—162